(12) United States Patent
Lee

(10) Patent No.: US 12,556,756 B2
(45) Date of Patent: Feb. 17, 2026

(54) SYSTEM COMPRISING TV AND REMOTE CONTROL, AND CONTROL METHOD THEREFOR

(71) Applicant: LG ELECTRONICS INC., Seoul (KR)

(72) Inventor: Kiwoong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/704,438

(22) PCT Filed: Oct. 29, 2021

(86) PCT No.: PCT/KR2021/015368
§ 371 (c)(1),
(2) Date: Apr. 24, 2024

(87) PCT Pub. No.: WO2023/074956
PCT Pub. Date: May 4, 2023

(65) Prior Publication Data
US 2025/0008178 A1     Jan. 2, 2025

(51) Int. Cl.
*H04N 21/422* (2011.01)
*G10L 15/22* (2006.01)

(52) U.S. Cl.
CPC ....... *H04N 21/42222* (2013.01); *G10L 15/22* (2013.01)

(58) Field of Classification Search
CPC .......... H04N 21/42222; H04N 21/4222; G10L 15/22
See application file for complete search history.

(56) References Cited

U.S. PATENT DOCUMENTS

| | | | |
|---|---|---|---|
| 10,770,067 B1 * | 9/2020 | Prasad | H04N 21/4828 |
| 2013/0173270 A1 | 7/2013 | Han et al. | |
| 2017/0154625 A1 | 6/2017 | Heo | |
| 2019/0018635 A1 * | 1/2019 | Vassigh | G06F 3/167 |

(Continued)

FOREIGN PATENT DOCUMENTS

| | | | | |
|---|---|---|---|---|
| CN | 112243588 B | * | 7/2022 | G10L 15/22 |
| KR | 1020150040445 | | 4/2015 | |

(Continued)

OTHER PUBLICATIONS

PCT International Application No. PCT/KR2021/015368, International Search Report dated Jul. 27, 2022, 11 pages.

(Continued)

*Primary Examiner* — John W Miller
(74) *Attorney, Agent, or Firm* — LEE, HONG, DEGERMAN, KANG & WAIMEY (57) ABSTRACT

A control method for a system comprising a TV and a remote control, according to one embodiment of the present invention, comprises steps in which: a user's voice is received, at a first time point, through a first microphone attached to the remote control; the TV operates in response to the voice recognition result if the received user's voice is successfully recognized; and the TV displays an error guidance message or processes the user's voice received through a second microphone at the first time point, if recognition of the received user's voice has failed.

10 Claims, 8 Drawing Sheets

(56) References Cited

U.S. PATENT DOCUMENTS

| | | | |
|---|---|---|---|
| 2019/0392819 A1 | 12/2019 | Shin et al. | |
| 2021/0225375 A1* | 7/2021 | Carroll | G06F 3/167 |
| 2023/0139356 A1* | 5/2023 | Sallas | H04N 21/42222 |
| | | | 348/734 |
| 2025/0008178 A1* | 1/2025 | Lee | H04N 21/42222 |

FOREIGN PATENT DOCUMENTS

| | | | |
|---|---|---|---|
| KR | 101521363 | 5/2015 | |
| KR | 1020190017507 | 2/2019 | |
| KR | 102224484 | 3/2021 | |
| KR | 1020210068353 | 6/2021 | |
| WO | WO-2020129695 A1 * | 6/2020 | G06F 3/167 |

OTHER PUBLICATIONS

European Patent Office Application Serial No. 21962580.3, Search Report dated Apr. 22, 2025, 10 pages.

* cited by examiner

SYSTEM COMPRISING TV AND REMOTE CONTROL, AND CONTROL METHOD THEREFOR

CROSS-REFERENCE TO RELATED APPLICATION(S)

This application is the National Stage filing under 35 U.S.C. 371 of International Application No. PCT/KR2021/015368, filed on Oct. 29, 2021, the contents of which are all incorporated by reference herein in its entirety.

TECHNICAL FIELD

The present disclosure relates to a television or remote control. More specifically, the present disclosure is applicable to any device having at least one microphone (e.g., a remote control for a television).

BACKGROUND ART

With the development of AI technology, various speech recognition services are becoming available. For example, a company that was the first to release an AI speaker added seven microphones to its AI speaker to accurately recognize the voice of a user speaking from a distance. It uses multiple microphones to accurately estimate the direction of the user's location and amplifies the sound by organizing a beam pattern. It adopts beamforming technology, which amplifies the signal based on the phase difference of multiple receivers. Furthermore, most AI speakers are designed to take commands after a call word is spoken. If the call word is not spoken, it is difficult for the speakers to pinpoint where the user is.

In theory, more microphones can collect more accurate speech information, but there is some debate about the most efficient number of microphones due to hardware design (and increasing the number of microphones can lead to higher costs for manufacturers). For example, the AI speaker from one company has two microphones, the AI speaker from another company has six microphones, and the AI speaker from still another company has four microphones.

In recent years, remote controls have been equipped with microphones to implement speech recognition for TV control. However, TV remote controls are typically equipped with a unidirectional microphone (which is used for its robustness to ambient noise), and there are increasing cases where users are unaware of the exact location of the microphone and thus speak into areas where there are no microphones installed (It was found that there are various cases. For example, users mistakenly assume that the microphone location on their mobile phone and the microphone location on the TV remote control are the same, or users mistakenly assume that there is a microphone near the button for speech recognition on the TV remote control).

In particular, the unidirectional microphone is characterized by a large response to sound coming from a specific direction, and smaller responses to directions other than the axis of the specific direction. This characteristic is often used to detect only specific sounds in places where there is a lot of noise around.

Therefore, unless a user speaks exactly into a single directional microphone installed on the TV remote control, the speech recognition rate may be very low.

DISCLOSURE

Technical Problem

One embodiment of the present disclosure is directed to addressing an issue that arises when a user does speak at the location of a microphone provided on a TV remote control.

Another embodiment of the present disclosure is directed to providing specific criteria for distinguishing between a case where a user does not speak at the location of the microphone on the TV remote control and a case where the user speaks properly at the location but simply in a small voice.

Another embodiment of the present disclosure is directed to improving the user speech recognition rate by communication with other nearby microphones (e.g., an omnidirectional microphone installed on the TV or other AI speakers) in addition to the TV remote control.

Technical Solution

According to one embodiment of the present disclosure, a method of controlling a system including a television (TV) and a remote control may include receiving a user speech through a first microphone attached to the remote control at a first time, based on recognition of the received user speech being successful, the TV performing an operation according to a result of the speech recognition, and based on the recognition of the received user speech being unsuccessful, the TV displaying an error message or processing the user speech received through a second microphone at the first time.

For example, the first microphone may correspond to a directional microphone, and the second microphone may correspond to a omnidirectional microphone installed on the TV or another device.

According to another embodiment of the present disclosure, the method may further include, based on the recognition of the received user speech being unsuccessful, converting data about the user speech into a frequency domain.

According to another embodiment of the present disclosure, the method may further include, based on that no gain is present in a first frequency range (e.g., a frequency range of 100 Hz or less and a frequency range of 10 kHz or more) as a result of an analysis of the converted data in the frequency domain, determining whether the user speech received through the second microphone is recognized.

According to another embodiment of the present disclosure, the method may further include, based on that the recognition of the user speech received through the second microphone is unsuccessful as a result of the determination, displaying, by the TV, a graphical image to indicate a position of the first microphone attached to the remote control.

According to another embodiment of the present disclosure, the method may further include, based on a gain is present in a second frequency range (e.g., a frequency range of 60 Hz or more and 15 kHz or less) as the result of the analysis of the converted data in the frequency domain, displaying a sound pressure error message by the TV.

According to one embodiment of the present disclosure, a system may include a remote control configured to receive a user speech through a first microphone at a first time and transmit the received user speech, and a TV configured to perform, based on recognition of the received user speech being successful, an operation according to a result of the speech recognition.

For example, based on the recognition of the received user speech being unsuccessful, the TV displays an error message or processes the user speech received through a second microphone at the first time.

Advantageous Effects

According to one embodiment of the present disclosure, an issue that arises when a user does speak at the location of a microphone provided on a TV remote control may be addressed.

Another embodiment of the present disclosure may provide specific criteria for distinguishing between a case where a user does not speak at the location of the microphone on the TV remote control and a case where the user speaks properly at the location but simply in a small voice.

According to another embodiment of the present disclosure, the user speech recognition rate may be improved by communication with other nearby microphones in addition to the TV remote control.

Other advantageous effects not explicitly mentioned herein will be understood by those skilled in the art from the context of the disclosure as a whole.

BEST MODE

Figure 1:
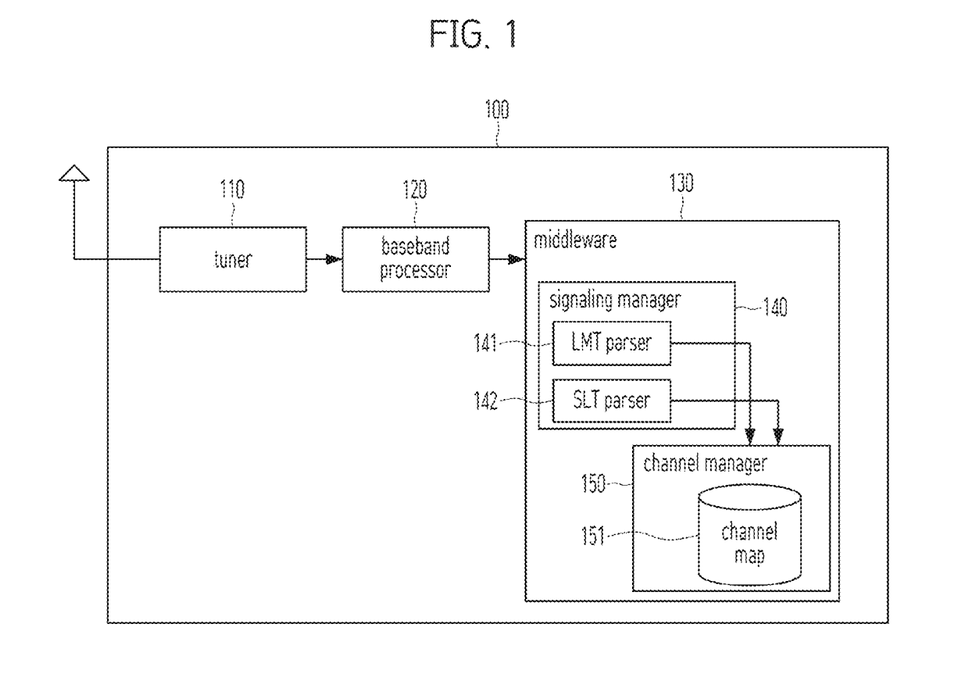
FIG. 1 illustrates internal components of a TV according to an embodiment of the disclosure.

FIG. 1 illustrates internal components of a TV according to an embodiment of the disclosure.

The disclosure is applicable to a variety of TV products, for example, the European standard, Digital Video Broadcasting (DVB) or the North American/Korean standard, Advanced Television Systems Committee (ATSC) 3.0.

However, although an exemplary process of performing an initial service scan operation by a TV 100 in conformance to the ATSC 3.0 standard is described with reference to FIG. 1, the scope of the disclosure should be determined in accordance with the appended claims.

A tuner 110 determines whether a signal is present, using a predetermined list of frequencies. Upon detection of a signal at a given frequency, a baseband processor 120 extracts L1 signaling of a preamble.

Further, the baseband processor 120 may transmit physical layer pipe (PLP) data including link layer signaling and low level signaling (LLS) to middleware 130, and the middleware 130 may extract the link layer signaling and the LLS from the PLP data.

The middleware 130 includes a signaling manager 140 and a channel manager 150.

After receiving the PLP data including the link layer signaling and the LLS from the baseband processor 120, the middleware 130 passes the data to an appropriate parser.

For example, the middleware 130 extracts a link mapping table (LMT) from the link layer signaling and passes the LMT to an LMT parser 141. Further, the middleware 130 extracts a service list table (SLT) from the LLS and passes the SLT to an SLT parser 142.

The LMT parser 141 parses the LMT and extracts first information (e.g., a PLPID, session information (an IP address and a port number), and so on) required to generate a channel map.

The SLT parser 142 parses the SLT and extracts second information (e.g., a service id, a service name, and so on) required to generate the channel map.

The extracted first and second information are stored in a channel map 151.

Figure 2:
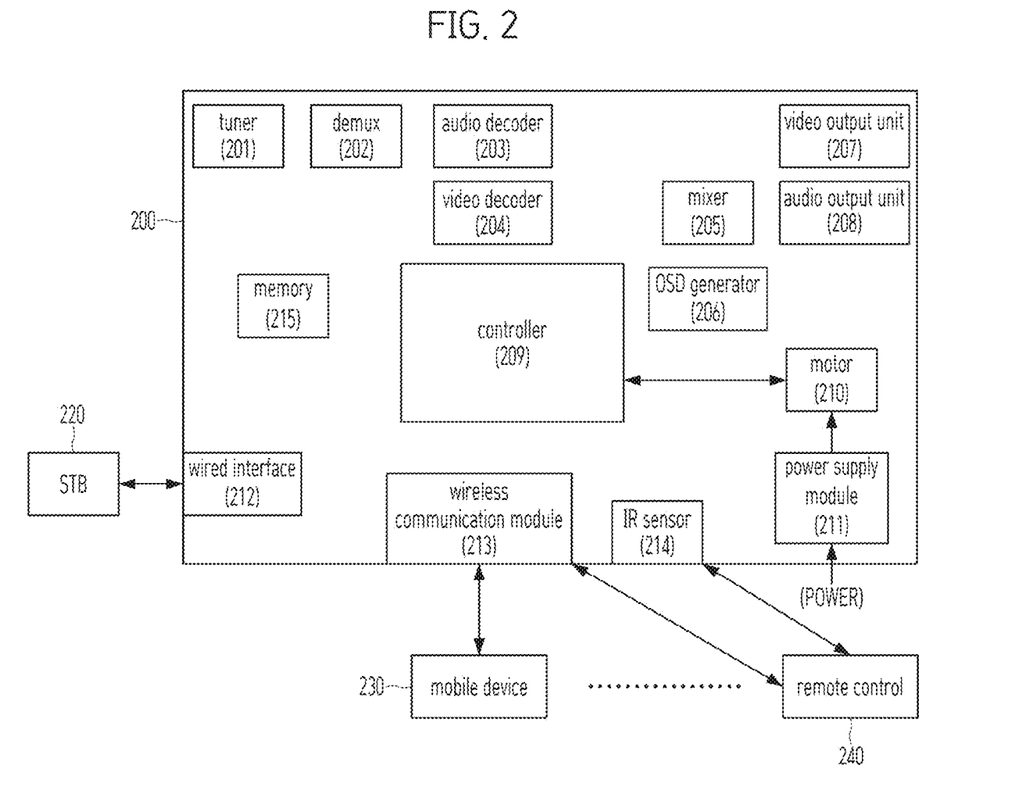
FIG. 2 illustrates external devices and internal components of a TV according to another embodiment of the disclosure.

FIG. 2 illustrates external devices and internal components of a TV according to another embodiment of the disclosure. It is also possible for those skilled in the art may combine some components to implement the disclosure, referring to FIGS. 2 and 3. For example, the baseband processor 120 and the middleware 130 illustrated in FIG. 1 may be included in a controller 209 illustrated in FIG. 2.

While a TV 200 illustrated in FIG. 2 includes various components, the scope of the disclosure is not limited thereto and should be defined in accordance with the appended claims.

Further, the internal components of the TV 200 illustrated in FIG. 2 may be controlled through the controller 209 and directly or indirectly connected to each other. That is, although not shown in FIG. 2, all of the internal components of the TV 200 illustrated in FIG. 2 are designed to be able to directly or indirectly transmit and receive control signals and/or data.

First, a tuner 201 receives a broadcast signal through an antenna or the like, and a demux or demultiplexer 202 demultiplexes the broadcast signal into audio data and video data.

An audio decoder 203 decodes the audio data (which has been encoded) included in the broadcast signal, and a video decoder 204 decodes the video data (which has been encoded) included in the broadcast signal.

The decoded audio data is output through an audio output unit 207. The audio output unit 207 may be, for example, a speaker attached to or spaced apart from the TV 200.

The decoded video data is output directly through a video output unit 208. Alternatively, a mixer 205 mixes menu data generated by an OSD generator 206 with the video data and transmits the mixed data to the video output unit 208.

A memory 215 stores various control data and commands for controlling the TV 200, and the controller 209 may control all of the components in the TV by referring to the memory 215.

Further, the TV 200 transmits and receives data to and from various external devices in its vicinity by communicating with them. For example, the TV 200 receives video/audio data from an STB 220 via a wired interface 212, and the video/audio data is processed by the audio decoder 203 and the video decoder 204, respectively. Alternatively, the received video/audio data may be output directly through the audio output unit 207 and the video output unit 208 bypassing the decoders 203 and 204.

The TV 200 transmits and receives various data to and from a mobile device 230 (e.g., a portable phone/wearable device or the like) via a wireless communication module 213, and receives an IR signal from a remote control 240 through an IR sensor 214. Alternatively, the remote control 240 capable of Bluetooth communication such as BT transmits and receives various data to and from the TV via the wireless communication module 213.

Unlike a conventional TV, the TV 200 according to an embodiment of the disclosure further includes a motor 210 inside or outside the TV 200. Therefore, it is possible to freely control the area of an exposed screen of the TV 200 by using the motor 210 (more specific embodiments in this regard will be described in more detail below with reference to FIGS. 3 to 6). In contrast, the conventional TV suffers from the problem that a full screen of the same size is always exposed.

However, since additional power needs to be supplied to the motor 210 through a power supply module 211 in an embodiment of the disclosure unlike the prior art, it is important to minimize power consumption by optimally controlling the motor, and defining specific information to be displayed according to the area of the exposed screen of the TV is required as a very important interface technology. As described above, the above technical requirements do not need to be considered for the conventional TV because the full screen of the same size is always exposed.

It is explicitly stated that the present invention is applicable to both TVs with fixed or variable screen sizes.

Figure 3:
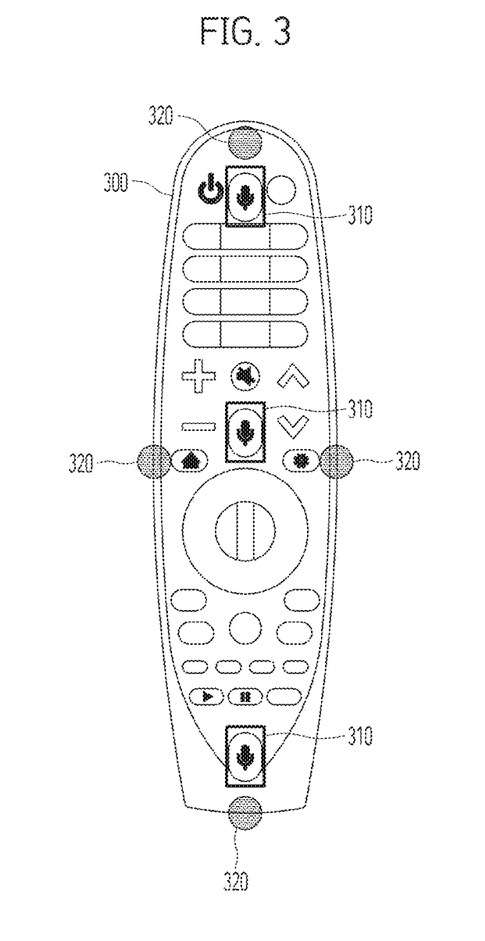
FIG. 3 illustrates various positions of microphones and various positions of buttons for voice commands on a remote control according to an embodiment of the present disclosure.

FIG. 3 illustrates various positions of microphones and various positions of buttons for voice commands on a remote control according to an embodiment of the present disclosure.

As shown in FIG. 3, the position of the microphone 320 on the remote control 300 may be top, middle, bottom, or the like depending on the TV manufacturer. Further, the position of a button 310 that triggers the speech recognition function may also be top, middle, bottom, or the like. Of course, in addition to the microphone positions 320 and button positions 310 shown in FIG. 3, other positions may be used by different manufacturers (as there is no specific standard for the position).

In particular, in the case where the microphone 320 provided on the remote control 300 is a unidirectional microphone, the user should speak toward the microphone 320 to increase the speech recognition rate when the user speaks a voice.

However, users often do not know the exact position of the microphone 320 on the remote control 300. Further, experiments and researches have shown that users often speak toward a position other than the position of the microphone 320 on the remote control 300 for the following reasons.

First, the user may make the mistake of assuming that the microphone position on the mobile phone and the microphone position on the TV remote control are the same.

S Second, the user may make the mistake of assuming that the microphone 320 is positioned near the speech recognition button 310.

Various embodiments of the present disclosure that may address all those issues will be described in detail below with reference to FIG. 4.

Figure 4:
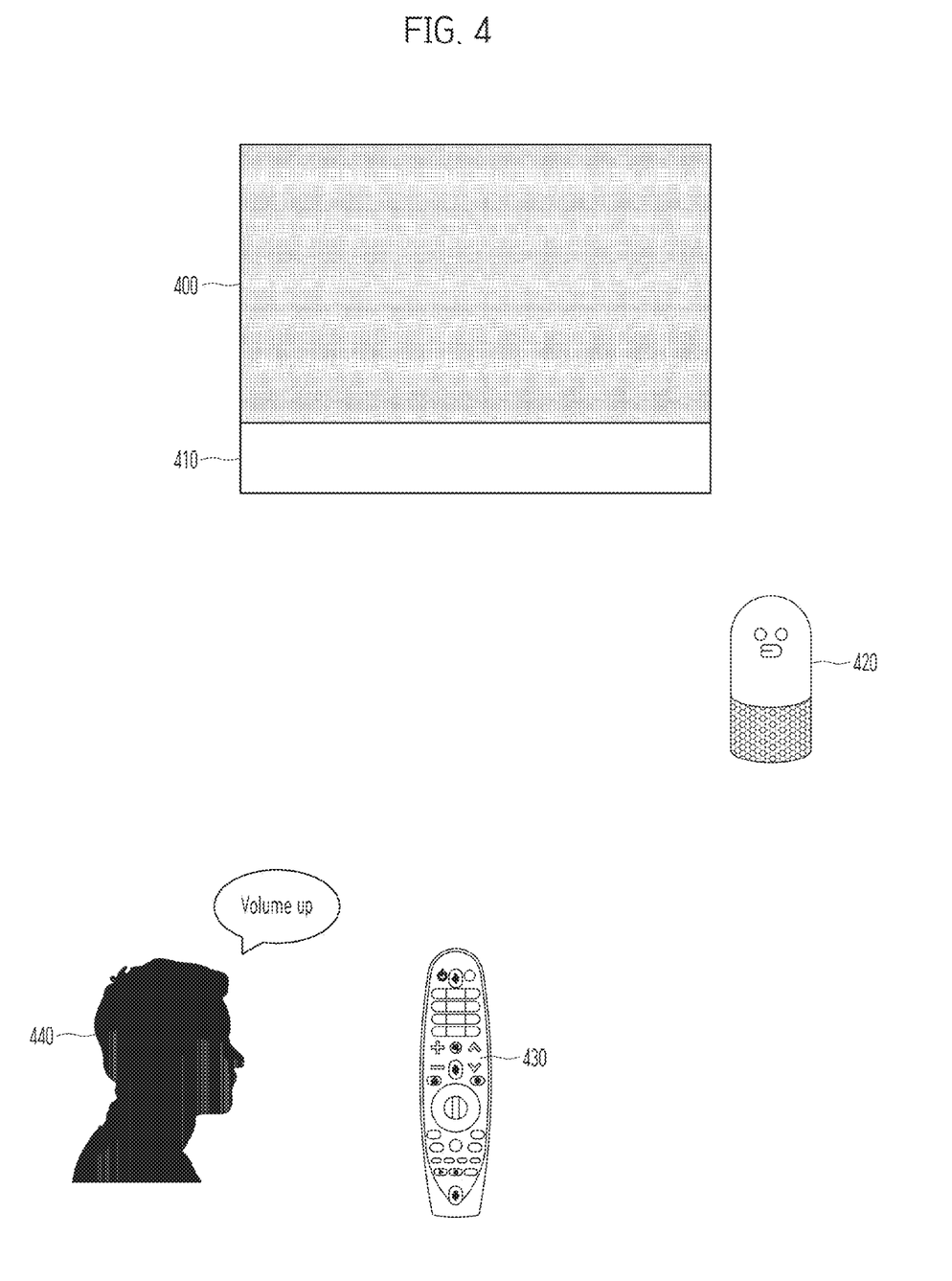
FIG. 4 illustrates microphones on a TV, remote control, and external device according to an embodiment of the present disclosure.

FIG. 4 illustrates microphones on a TV, remote control, and external device according to an embodiment of the present disclosure. As shown in FIG. 4, a system according to an embodiment of the present disclosure basically includes a TV 400 and a remote control 430. However, it is also within the scope of the present disclosure to implement the invention with only one of the elements or to employ an additional external device 420 (e.g., an AI speaker, etc.), as needed.

When a user utters, for example, "Volume up" at a first time, the user speech is received through a first microphone attached to the remote control 430. Also, at the same first time, the same user speech is received through a second microphone (e.g., a microphone 410 installed on the TV 400 or a microphone attached to the AI speaker 420). Here, the first microphone attached to the remote control 430 may be a unidirectional microphone, and the second microphone may be an omnidirectional microphone.

First, when the recognition of the user speech (e.g., "Volume up") received through the first microphone attached to the remote control 430 is successful, the TV 400 performs an operation (of turning up the volume) according to the speech recognition result.

On the other hand, when the recognition of the user speech (e.g., "Volume up") received through the first microphone attached to the remote control 430 is unsuccessful, the TV 400 is designed to display an error message or process the user speech received through the second microphone (e.g., an omnidirectional microphone 410 installed on the TV 400 or an omnidirectional microphone installed on the external AI speaker 420, etc.).

In particular, one embodiment of the present disclosure has a unique technical effect of automatically analyzing the cause of the failure to recognize the user speech received through the first microphone attached to the remote control 430 and providing feedback to the user. In this regard, relevant embodiments will be described in detail below with reference to FIG. 5.

Figure 5:
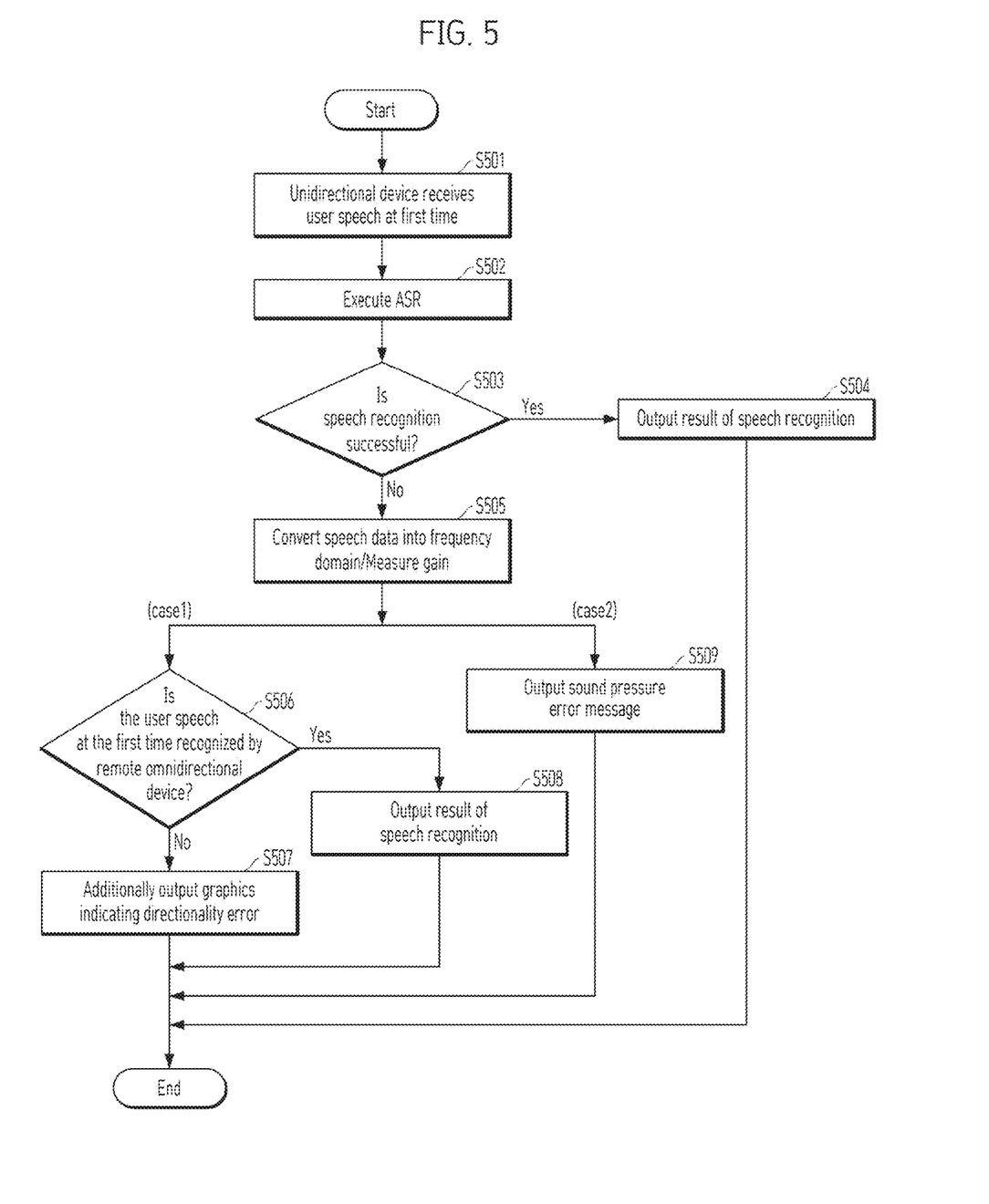
FIG. 5 is a flowchart illustrating a method of controlling a system including a TV and a remote control according to an embodiment of the present disclosure.

FIG. 5 is a flowchart illustrating a method of controlling a system including a TV and a remote control according to an embodiment of the present disclosure. It is within the scope of the present disclosure to design some or all of the operations illustrated in FIG. 5 to be implemented on the TV (400 in FIG. 4) or to be implemented on the remote control (430 in FIG. 4), as desired by those skilled in the art.

First, as shown in FIG. 5, a user speech is received by a unidirectional device at a first time (S501). Here, the unidirectional device refers to, for example, the microphone provided on the remote control 430 shown in FIG. 4.

Automatic speech recognition (ASR) is performed on the user speech received through the microphone on the remote control (S502). For example, ASR may be performed using a deep learning technique. The sound waves are digitized and sliced to create an acoustic spectrum. Then, deep learning is used to infer the context of letters and words from the patterns in the acoustic spectrum.

The technology for mechanically analyzing human language and processing the same into a form that computers can understand is known as natural language processing (NLP). Before the introduction of deep learning, semantic analysis was performed on a word-by-word basis for natural language processing. However, after the introduction of deep learning algorithms, the meaning of the whole sentence is inferred through phrase-by-phrase analysis. Of course, the present disclosure is applicable to the general case where a speech recognition system based on deep learning is not used.

Furthermore, the ASR in operation S502 may be performed by the TV 400, the remote control 430, the AI speaker 420, or an external server as shown in FIG. 4.

After performing the ASR in operation S502, the TV, remote control, or server determines whether the recognition of the user speech received in operation S501 is successful (S503).

When, as a result of the determination (S503), the recognition of the user speech is successful, the corresponding speech recognition result is executed and output through, for example, the TV (S504).

On the other hand, when, as a result of the determination (S503), the recognition of the user speech is unsuccessful, the TV converts the user speech data to the frequency domain and measures the gain (S505). However, the operations in FIG. 5, which can be performed by a remote control or a server as described above, will be exemplarily described as being performed by a TV. In this case, the user speech data received through the microphone on the remote control is transmitted to the TV.

When the result of the frequency domain analysis of the data converted in operation S505 corresponds to a first case (or first frequency range), it is determined whether the same user speech is recognized by the second microphone (e.g., an omnidirectional microphone installed on a TV or an AI speaker, etc.) (S506). Here, the first case (or first frequency range) means absence of a gain in, for example, a frequency range of 100 Hz or less and a frequency range of 10 kHz or more. A related embodiment will be described in detail below with reference to FIG. 6.

When, as a result of the determination (S506), the recognition of the user speech received through the second microphone is successful, the corresponding speech recognition result is executed and output through the TV (S508).

On the other hand, when, as a result of the determination (S503), the recognition of the user speech received through the second microphone is unsuccessful, the TV displays a graphical image to indicate the position of the first microphone attached to the remote control (S507). A related embodiment will be described in detail below with reference to FIG. 8.

When the result of the frequency domain analysis of the data converted in operation S505 corresponds to a second case (or second frequency range), the TV displays a sound pressure error message (S509). Here, the second case (or second frequency range) means presence of a gain in, for example, a range of frequencies greater than or equal to 60 Hz and less than or equal to 15 kHz. A related embodiment will be described in detail below with reference to FIGS. 6 and 7.

Figure 6:
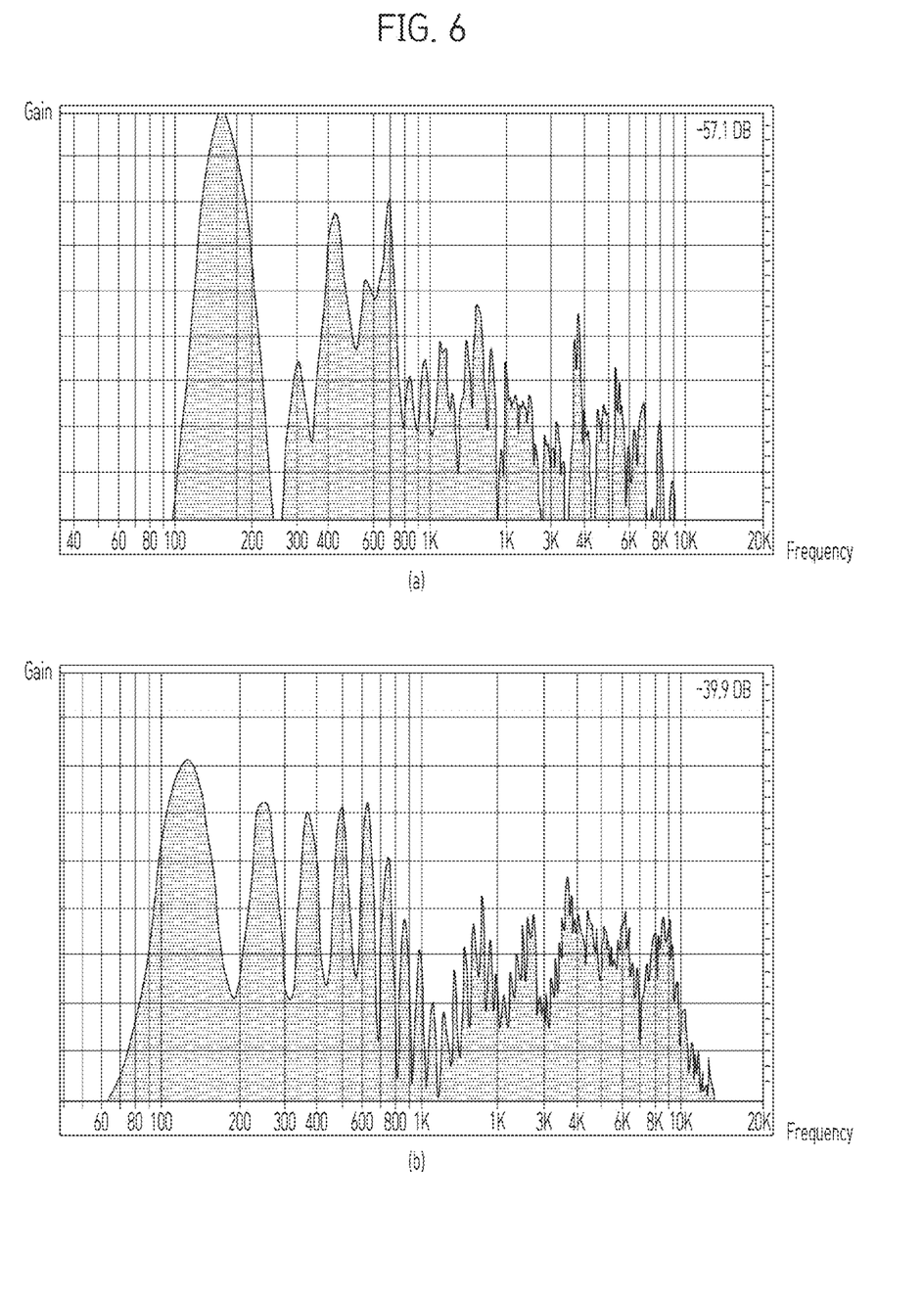
FIG. 6 shows experimental data for distinguishing between a case where a user speech is input from a direction other than the microphone position of the remote control and a case where the user speech is input from a direction corresponding to the microphone position but is simply spoken at a lower volume, according to one embodiment of the present disclosure.

FIG. 6 shows experimental data for distinguishing between a case where the user speech is input from a direction other than the microphone position of the remote control and a case where the user speech is input from a direction corresponding to the microphone position but is simply spoken at a lower volume, according to one embodiment of the present disclosure.

In particular, FIG. 6-(a) corresponds to the first case of FIG. 5 (i.e., the case where the user speech is not properly oriented toward the microphone on the remote control), and FIG. 6¬-(b) corresponds to the second case of FIG. 5 (i.e., the case where the user speech is simply muffled).

First, the frequency domain graph shown in FIG. 6-(a) was obtained experimentally when the voice of the user speech was not small but the directionality towards the microphone on the remote control was ignored.

In particular, as shown in FIG. 6-(a), there is no gain in the frequency region below 100 Hz, and there is no gain in the frequency region above 10 kHz frequency (i.e., low/high cut effect, etc.). Furthermore, it was experimentally confirmed that there are regions with no gain in the frequency range of 100 hz to 10 kHz. In this case, it is necessary to output the graphical image shown in FIG. 8 on the TV screen to guide the user to speak properly again.

On the other hand, the frequency domain graph shown in FIG. 6-(b) was obtained experimentally wen there was no problem with directionality towards the microphone on the remote control, but the voice of the speech was simply small.

Figure 7:
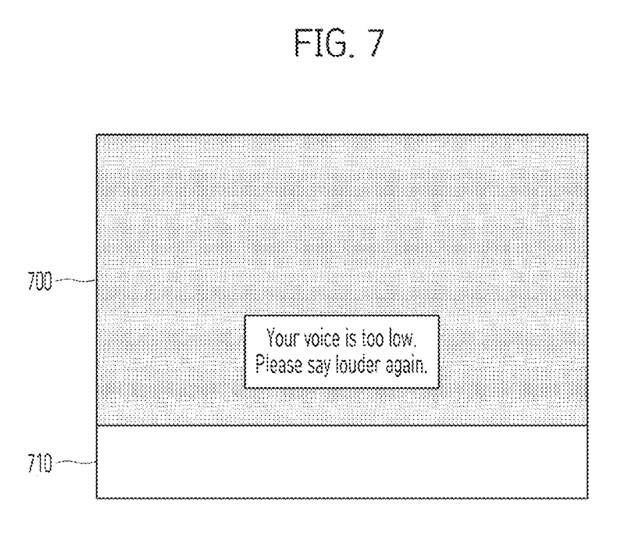
FIG. 7 illustrates an embodiment of operation S509 of FIG. 5 in detail according to one embodiment of the present disclosure.

In particular, as shown in FIG. 6-(b), it was experimentally confirmed that there is gain in the range of 60 hz to 15 kHz (the audible frequency band), and that the gain is distributed relatively evenly. Therefore, in this case, a simple text as shown in FIG. 7 is sufficient to guide the user to speak properly again. Conventional technology has not been able to distinguish this situation and provide guidance.

FIG. 7 illustrates an embodiment of operation S509 of FIG. 5 in detail according to one embodiment of the present disclosure.

In particular, in the case of FIG. 6-(b), as shown in FIG. 7, the TV 700 of the embodiment of the present disclosure simply displays a guide message "Your voice is too low. Please say louder again." Since the user has spoken properly towards the position of the microphone on the remote control, there is no need to process and output the graphical image of FIG. 8 (such as the remote control and the position of the microphone).

Alternatively, it will be appreciated that it is within the scope of the present disclosure to have the aforementioned message spoken out through a speaker 710 added to the TV 700. Such a variant design may minimize obstruction of the TV broadcast screen.

Figure 8:
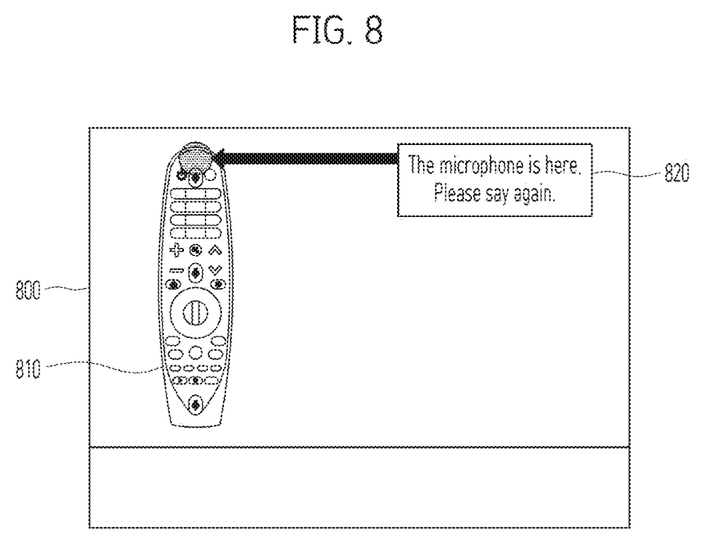
FIG. 8 illustrates an embodiment of operation S507 of FIG. 5 in detail according to one embodiment of the present disclosure.

FIG. 8 illustrates an embodiment of operation S507 of FIG. 5 in detail according to one embodiment of the present disclosure.

In particular, in the case of FIG. 6-(a) described above, as shown in FIG. 8, the TV 800 of the embodiment of the present disclosure displays graphical image data 810 highlighting the position of the microphone in the remote control, together with a guide message "The microphone is here. Please say again." Accordingly, the time required for the user to locate the microphone separately may be reduced, and the speech recognition rate may be improved when speaking again.

The present disclosure will be described again with reference to FIGS. 2 and 4 (redundant descriptions will be omitted wherever possible, but those skilled in the art will be able to interpret the present disclosure with reference to the other figures).

A system according to one embodiment of the present disclosure includes both the remote control 240, 430 and the TV 200, 400. At a first time, the remote control 240, 430 receives a user speech (e.g., Channel up) through the first microphone attached to the remote control. The received user speech data is transmitted from the remote control 240, 430 to the TV 200, 400. Here, the communication between the remote control and the TV is performed via a wireless communication module 213.

When the recognition of the user speech is successful, the TVs 200, 400 performs an operation (e.g., 1 up from the current channel) according to the result of the speech recognition. For example, the controller 209 controls the tuner 201 to tune the channel up.

On the other hand, when the recognition of the user speech is unsuccessful, the TV 200, 400 displays an error message (see FIG. 7 or 8) or process the user speech received through the second microphone (such as an omni-directional microphone installed on the TV or an external device) at the first time. The recognition of the user speech may be performed directly by the controller 209, or may be performed by receiving a result from an external server.

In another aspect of the present disclosure, the above-described proposals or inventive operations may also be provided as code that can be implemented, performed, or executed by a "computer" (a broad concept that includes a system on a chip (SoC) or a microprocessor), or as an application, computer-readable storage medium, or computer program product storing or including the code, which are also within the scope of the present disclosure.

The detailed description of the preferred embodiments of the present disclosure has been provided above to enable those skilled in the art to implement and practice the present disclosure. Although the above description has been provided with reference to preferred embodiments of the disclosure, it will be understood by those skilled in the art that various modifications and changes can be made to the disclosure without departing from the scope of the present disclosure. For example, those skilled in the art can utilize the elements described in the embodiments above in combination with each other.

Accordingly, the disclosure is not intended to be limited to the embodiments disclosed herein, but rather to provide the broadest scope consistent with the principles and novel features disclosed herein.

Mode for Disclosure

Various embodiments of the disclosure have been described in the Best Mode and it is apparent that it is within the scope of the disclosure to combine embodiments described in two or more drawings as those skilled in the art deem necessary.

INDUSTRIAL APPLICABILITY

The present disclosure is applicable to various types of remote controls and TV systems, and thus has industrial applicability.

The invention claimed is:

1. A method of controlling a system including a television (TV) and a remote control, the method comprising:
   receiving a user speech through a first microphone attached to the remote control at a first time;
   based on recognition of the received user speech being successful, the TV performing an operation according to a result of the speech recognition; and
   based on the recognition of the received user speech being unsuccessful, the TV displaying an error message or processing the user speech received through a second microphone at the first time, and
   based on recognition of the user speech received through the second microphone being unsuccessful, displaying, by the TV, a graphical image to indicate a position of the first microphone attached to the remote control.

2. The method of claim 1, wherein the first microphone corresponds to a directional microphone,
   wherein the second microphone corresponds to a omni-directional microphone installed on the TV or another device.

3. The method of claim 1, further comprising:
   based on the recognition of the received user speech being unsuccessful, converting data about the user speech into a frequency domain.

4. The method of claim 3, further comprising:
   based on that no gain is present in a frequency range of 100 Hz or less and a frequency range of 10 kHz or more as a result of an analysis of the converted data in the frequency domain, determining whether the user speech received through the second microphone is recognized.

5. The method of claim 1, further comprising:
   based on a gain being present in a frequency range of 60 Hz or more and 15 kHz or less as the result of the analysis of the converted data in a frequency domain, displaying a sound pressure error message by the TV.

6. A system comprising:
   a remote control configured to receive a user speech through a first microphone at a first time and transmit the received user speech; and
   a television (TV) configured to perform, based on recognition of the received user speech being successful, an operation according to a result of the speech recognition,
   wherein, based on the recognition of the received user speech being unsuccessful, the TV displays an error message or processes the user speech received through a second microphone at the first time, and
   wherein, based on recognition of the user speech received through the second microphone being unsuccessful, the TV displays a graphical image to indicate a position of the first microphone attached to the remote control.

7. The system of claim 6, wherein the first microphone corresponds to a directional microphone,
   wherein the second microphone corresponds to a omni-directional microphone installed on the TV or another device.

8. The system of claim 6, wherein, based on the recognition of the received user speech being unsuccessful, the TV converts data about the user speech into a frequency domain.

9. The system of claim 8, wherein, based on that no gain is present in a first frequency range as a result of an analysis of the converted data in the frequency domain, the TV determines whether the user speech received through the second microphone is recognized.

10. The system of claim 6, wherein, based on a gain is being present in a second frequency range different from a first frequency range as the result of the analysis of the converted data in the frequency domain, the TV displays a sound pressure error message.

* * * * *